(12) United States Patent
Tajima et al.

(10) Patent No.: US 6,950,564 B2
(45) Date of Patent: Sep. 27, 2005

(54) IMAGE PROCESSING APPARATUS AND METHOD AND PROGRAM OF THE SAME

(75) Inventors: Hiroshi Tajima, Kanagawa (JP); Tetsuya Hirano, Kanagawa (JP)

(73) Assignee: Sony Corporation (JP)

( * ) Notice: Subject to any disclaimer, the term of this patent is extended or adjusted under 35 U.S.C. 154(b) by 569 days.

(21) Appl. No.: 10/184,928

(22) Filed: Jul. 1, 2002

(65) Prior Publication Data

US 2003/0031374 A1 Feb. 13, 2003

(30) Foreign Application Priority Data

Jul. 4, 2001 (JP) ..................................... P2001-203336

(51) Int. Cl.[7] ............................................... G06K 9/54
(52) U.S. Cl. ..................... 382/305; 382/254; 345/629
(58) Field of Search ................................. 382/162, 254, 382/266, 264, 284, 305; 345/422, 592, 593, 600, 629, 639

(56) References Cited

U.S. PATENT DOCUMENTS 5,528,738 A * 6/1996 Sfarti et al. ................. 345/443
6,441,818 B1 * 8/2002 Kurose ........................ 345/422
6,473,091 B1 * 10/2002 Iida et al. .................... 345/589
6,530,010 B1 * 3/2003 Hung et al. ..................... 712/1
6,750,876 B1 * 6/2004 Atsatt et al. ................. 345/656

* cited by examiner

Primary Examiner—Kanjibhai Patel
(74) Attorney, Agent, or Firm—Radar, Fishman & Grauer PLLC; Ronald P. Kananen

(57) ABSTRACT

An image processing apparatus capable of flexibly changing edge enhancement, blurring, and other image effect processing, wherein, in accordance with the execution of a program by a CPU, the CPU produces control signals to control an image processing circuit, read circuits in the image processing circuit read image data from a memory circuit by using a texture function, a write circuit writes the image data produced by subtraction by a subtraction circuit, multiplication with a coefficient by a multiplication circuit, and addition by an addition circuit to the memory circuit, and the image processing circuit performs processing relating to image effects such as α-blending, edge enhancement, and blurring on the basis of the control signals from the CPU.

7 Claims, 11 Drawing Sheets

IMAGE PROCESSING APPARATUS AND METHOD AND PROGRAM OF THE SAME

BACKGROUND OF THE INVENTION

1. Field of the Invention

The present invention relates to an image processing apparatus and method and program of the same capable of flexibly changing α-blending, edge enhancement, blurring, and other image processing.

2. Description of the Related Art

Computer aided design (CAD) systems, amusement apparatuses, etc. include built-in rendering circuits for computer graphic processing.

These rendering circuits use exclusive hardware for the edge enhancement, blurring, and other image processing on the displayed images.

Since the rendering circuits perform edge enhancement, blurring, and other image processing by using exclusive hardware, there is the disadvantage that the edge enhancement, blurring, and other effects cannot be flexibly changed.

SUMMARY OF THE INVENTION

An object of the present invention is to provide an image processing apparatus and method and program of the same capable of flexibly changing the edge enhancement, blurring, and other image effect processing.

To attain the above object, according to a first aspect of the present invention, there is provided an image processing apparatus comprising a memory circuit for storing image data; a read circuit for reading at least first image data, second image data, and third image data from the memory circuit; a first processing circuit for producing fourth image data indicating a difference between the first image data and the second image data read by the read circuit; a second processing circuit for multiplying the fourth image data with a predetermined coefficient to produce fifth image data; a third processing circuit for adding the third image data and the fifth image data to produce sixth image data; a write circuit for writing the sixth image data to the memory circuit; and a control circuit for executing a predetermined program to control the read circuit, the first processing circuit, the second processing circuit, the third processing circuit, and the write circuit in accordance with execution of the program.

The operation of the first aspect of the present invention is as follows.

The control circuit executes the program to control the following processing in accordance with the execution of the program.

First, the read circuit reads first image data and second image data from the memory circuit.

Then, the first processing circuit generates fourth image data indicating a difference between the first image data and the second image data.

Then, the second processing circuit multiplies the fourth image data with a predetermined coefficient to produce fifth image data.

Further in parallel with the processing of the second processing circuit, the read circuit reads third image data from the memory circuit.

Then, the third processing circuit adds the third image data and the fifth image data to produce sixth image data.

Then, a write circuit writes the fifth image data in the memory circuit.

According to a second aspect of the present invention, there is provided a method of image processing comprising a first step of producing fourth image data indicating a difference between first image data and second image data; a second step of multiplying the fourth image data with a predetermined coefficient to produce fifth image data; and a third step of adding the third image data and the fifth image data to produce sixth image data, executing a predetermined program, and controlling the first to third steps in accordance with the execution of the program.

According to a third aspect of the present invention, there is provided a program executed by a processing apparatus to control a first processing circuit, a second processing circuit, and a third processing circuit comprising a first routine of producing fourth image data indicating a difference between first image data and second image data by the first processing circuit; a second routine of multiplying the fourth image data with a predetermined coefficient to produce fifth image data by the second processing circuit; and a third routine of adding the third image data and the fifth image data to produce sixth image data by the third processing circuit.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, embodiments of an image processing apparatus of the present invention will be explained.

Figure 1:
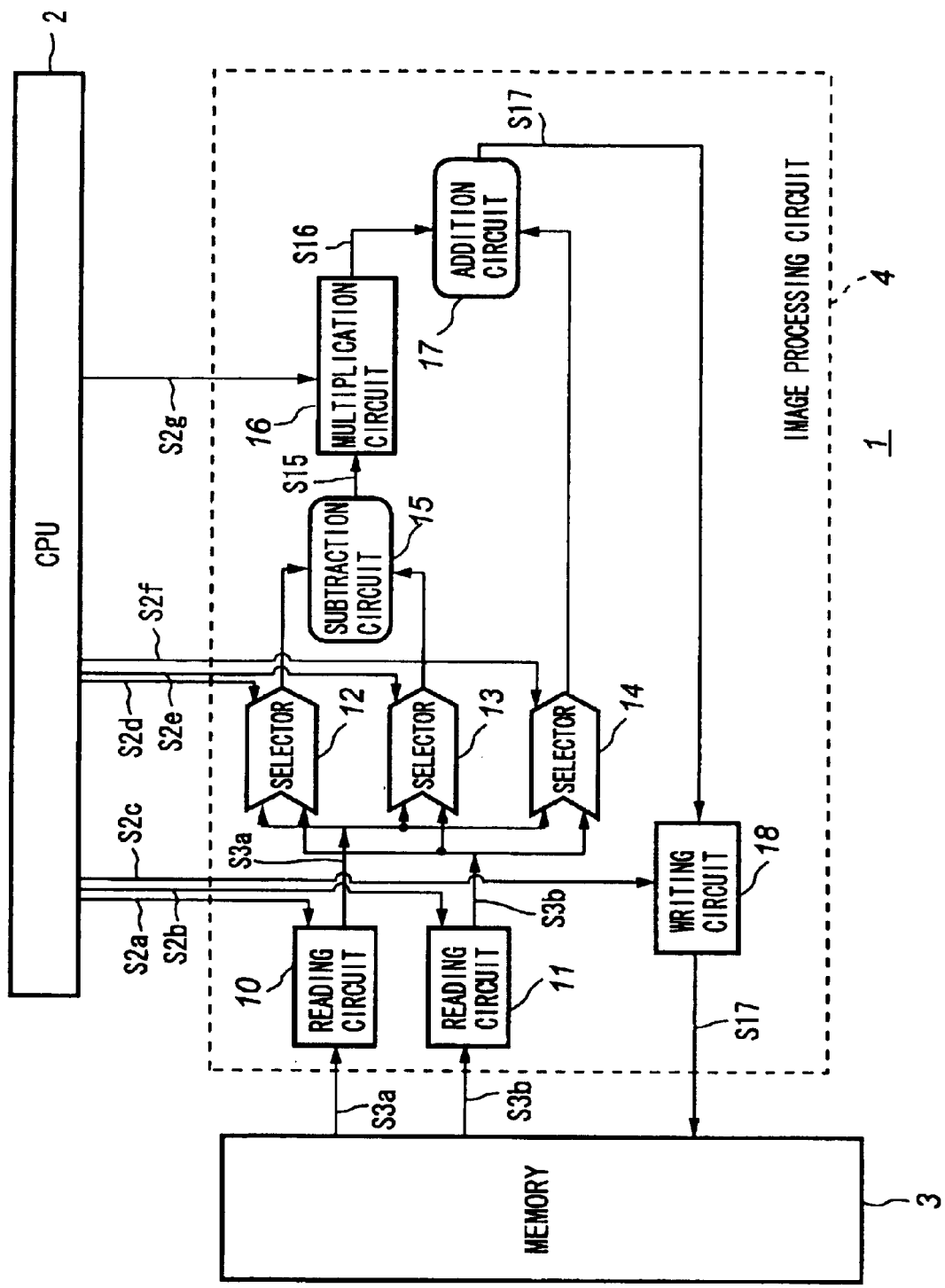
FIG. 1 is a view of the configuration of an image processing apparatus of the present embodiment.

FIG. 1 is a view of the configuration of an image processing apparatus 1 of the present embodiment.

As shown in FIG. 1, the image processing apparatus 1 comprises a CPU 2, a memory 3, and an image processing circuit 4.

The image processing apparatus 1 corresponds to the image processing apparatus of the present invention, the CPU 2 corresponds to the control circuit of the present invention, and the memory 3 corresponds to the memory circuit of the present invention.

CPU 2

The CPU 2 produces control signals S2a, S2b, S2c, S2d, S2e, S2f, and S2g, described later, to be output to a read circuit 10, a read circuit 11, a write circuit 18, a selector 12, a selector 13, a selector 14, and a multiplication circuit 16.

The CPU 2 executes a predetermined program to produce the control signals mentioned above in accordance with the execution of the program.

The memory 3 stores various image data (for example, texture data) to be used for a processing of the image processing circuit 4 so that the image data may be read by specifying a read position by pixel units using coordinate data (u, v).

Image Processing Circuit 4

The image processing circuit 4, as shown in FIG. 1, comprises, for example, the read circuits 10 and 11, the selectors 12, 13, and 14, the subtraction circuit 15, the multiplication circuit 16, the addition circuit 17, and the write circuit 18.

Here, the read circuits 10 and 11 correspond to the read circuit of the present invention, the selectors 12, 13, 14 correspond to the selecting circuit of the present invention, the subtraction circuit 15 corresponds to the first processing circuit of the present invention, the multiplication circuit 16 corresponds to the second processing circuit of the present invention, and the addition circuit 17 corresponds to the third processing circuit of the present invention.

The read circuit 10 reads image data S3a (first image data and third image data of present invention) from the memory 3 in units of pixel data by using coordinate data (u,v) of the image designated by a control signal S2a when reading image data from the memory 3 on the basis of the control signal S2a from the CPU 2.

Further, the read circuit 10 reads the image data S3a from an address of the memory 3 designated by the control signal S2a from the CPU 3.

The read circuit 10 outputs the image data S3a read from the memory 3 to first input terminals of the selectors 12, 13, and 14.

The read circuit 11 reads image data S3b (second image data and third image data of present invention) from the memory 3 in units of pixel data by using coordinate data (u,v) of the image designated by a control signal S2b when reading image data from the memory 3 on the basis of the control signal S2b from the CPU 2.

Further, the read circuit 11 reads image data S3b from an address of the memory 3 designated by the control signal S2b from the CPU 3.

The read circuit 11 outputs the image data S3b read from the memory 3 to second input terminals of the selectors 12, 13, and 14.

The selector 12 selects one of the image data S3a input from a first input terminal and the image data S3b input from a second input terminal on the basis of the control signal S2d from the CPU 2 and outputs the selected image data to the subtraction circuit 15.

The selector 13 selects one of the image data S3a input from a first input terminal and the image data S3b input from a second input terminal on the basis of the control signal S2e from the CPU 2 and outputs the selected image data to the subtraction circuit 15.

The selector 14 selects one of the image data S3a input from a first input terminal and the image data S3b input from a second input terminal on the basis of the control signal S2f from the CPU 2 and outputs the selected image data to the addition circuit 17.

The subtraction circuit 15 subtracts the image data input from the selector 13 from the image data input from the selector 12 to produce image data S15 (fourth image data of present invention) and outputs the image data S15 to the multiplication circuit 16.

The subtraction of the subtraction circuit 15 is performed, for example, by using the values of R, G, and B (pixel values) indicated by the pixel data for each of the pixel data which constitute the image data.

The multiplication circuit 16 multiplies the image data S15 with a coefficient indicated by the control signal S2g input from the CPU 2 to produce image data S16 (fifth image data of present invention) and outputs the image data S16 to the addition circuit 17.

The multiplication of the multiplication circuit 16 is performed, for example, by multiplying each of the image data constituting the image data S15 with the coefficient indicated by the control signal S2g.

The addition circuit 17 adds the image data S16 input from the multiplication circuit 16 and the image data input from the selector 14 to produce image data S17 (sixth image data of present invention) and outputs the image data S17 to the write circuit 18.

The addition of the addition circuit 17 is performed, for example, by using the values of R, G, and B indicated by the pixel data for each of the pixel data constituting the image data.

The write circuit 18 writes the image data S17 input from the addition circuit 17 to the address in the memory 3 designated by the control signal S2c from the CPU 2.

Below, examples of the operation of the image processing apparatus 1 shown in FIG. 1 will be explained.

First Example of Operation

Below, an example of the operation of the case of α-blending using the image processing apparatus 1 will be explained.

Here, an example of α-blending between an image IM_1 and an image IM_2 with a coefficient α will be explained referring to FIG. 2.

Figure 2:
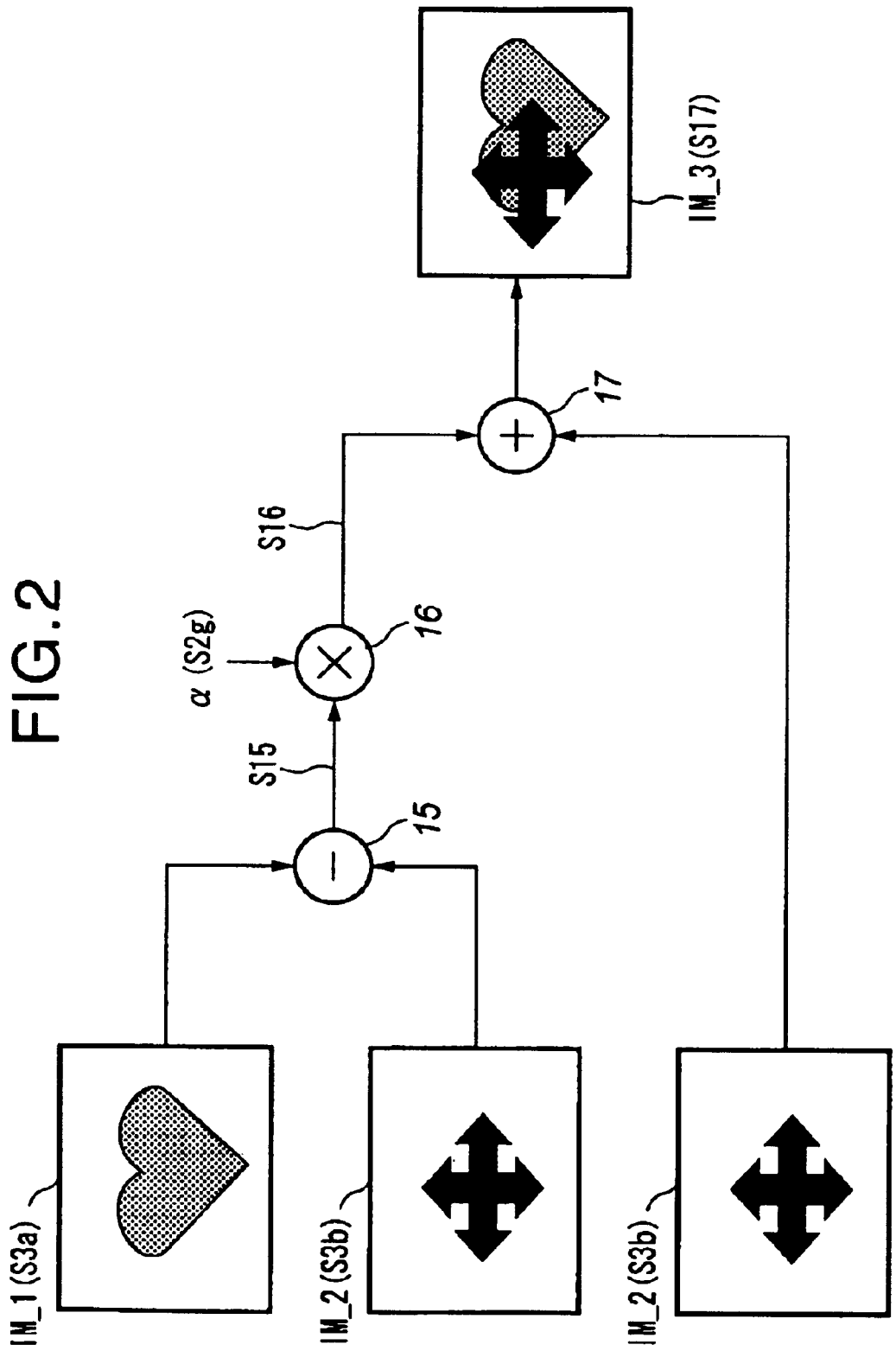
FIG. 2 is a view for explaining a case of α-blending using the image processing apparatus shown in FIG. 1.

In this case, the read circuit 10 shown in FIG. 1 reads the image data S3a of the image IM_1 shown in FIG. 2 from the memory 3, and the selector 12 selects the image data S3a and outputs it to the subtraction circuit 15.

In parallel with this, the read circuit 11 shown in FIG. 1 reads the image data S3b of the image IM_2 shown in FIG. 2 from the memory 3, and the selector 13 selects the image data S3b and outputs it to the subtraction circuit 15.

Then, the subtraction circuit 15 subtracts the image data S3b from the image data S3a, that is, subtracts the image IM_2 from the image IM_1, and then outputs the resultant image data S16 to the addition circuit 17.

Then, the multiplication circuit 16 multiplies the image data S15 by the coefficient α designated by the control signal S2g and then outputs the resultant image data S16 to the addition circuit 17.

Further, in parallel with the processing of the multiplication circuit 16, the read circuit 11 shown in FIG. 1 reads the image data S3b of the image IM_2 shown in FIG. 2 from the memory 3, and then the selector 14 selects the image data S3b and outputs it to the addition circuit 17.

Then, the addition circuit 17 adds the image data S16 from the multiplication circuit 16 and the image data S3b from the selector 14 to produce the image data S17 of an image IM_3 blending the image IM_1 and the image IM_2.

Then, the write circuit 18 writes the image data S17 to the memory 3.

The α-blending of the image processing apparatus 1 described above is shown in the following equation (1). Equation (1) may be modified to give an equation of general α-blending as shown in the following equation (2).

$$(\text{image IM\_1} - \text{image IM\_2}) \times \alpha + \text{image IM\_2} \tag{1}$$

$$\alpha \times \text{IM\_1} + (1-\alpha) \times \text{IM\_2} \tag{2}$$

Figure 3:
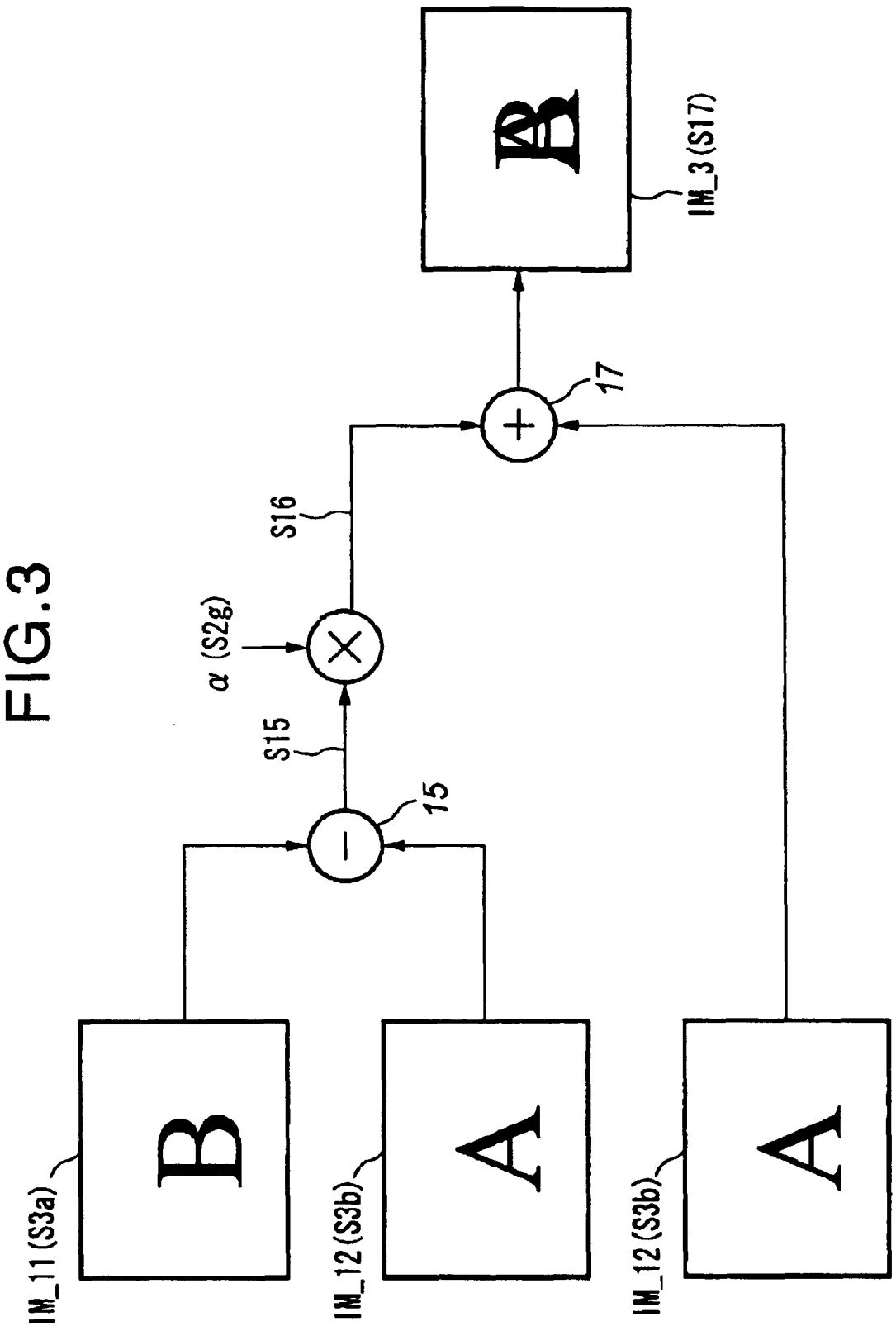
FIG. 3 is a view for explaining another case of α-blending using the image processing apparatus shown in FIG. 1.

FIG. 2 shows an example of α-blending the image IM_1 of a heart and the image IM_2 of an arrow. The image shown in FIG. 3 is obtained when using the image IM_1 of the letter "B" and the image IM_2 of the letter "A".

Second Example of Operation

Below, an example of the operation of the case of edge enhancement using the image processing apparatus 1 will be explained.

Figure 4:
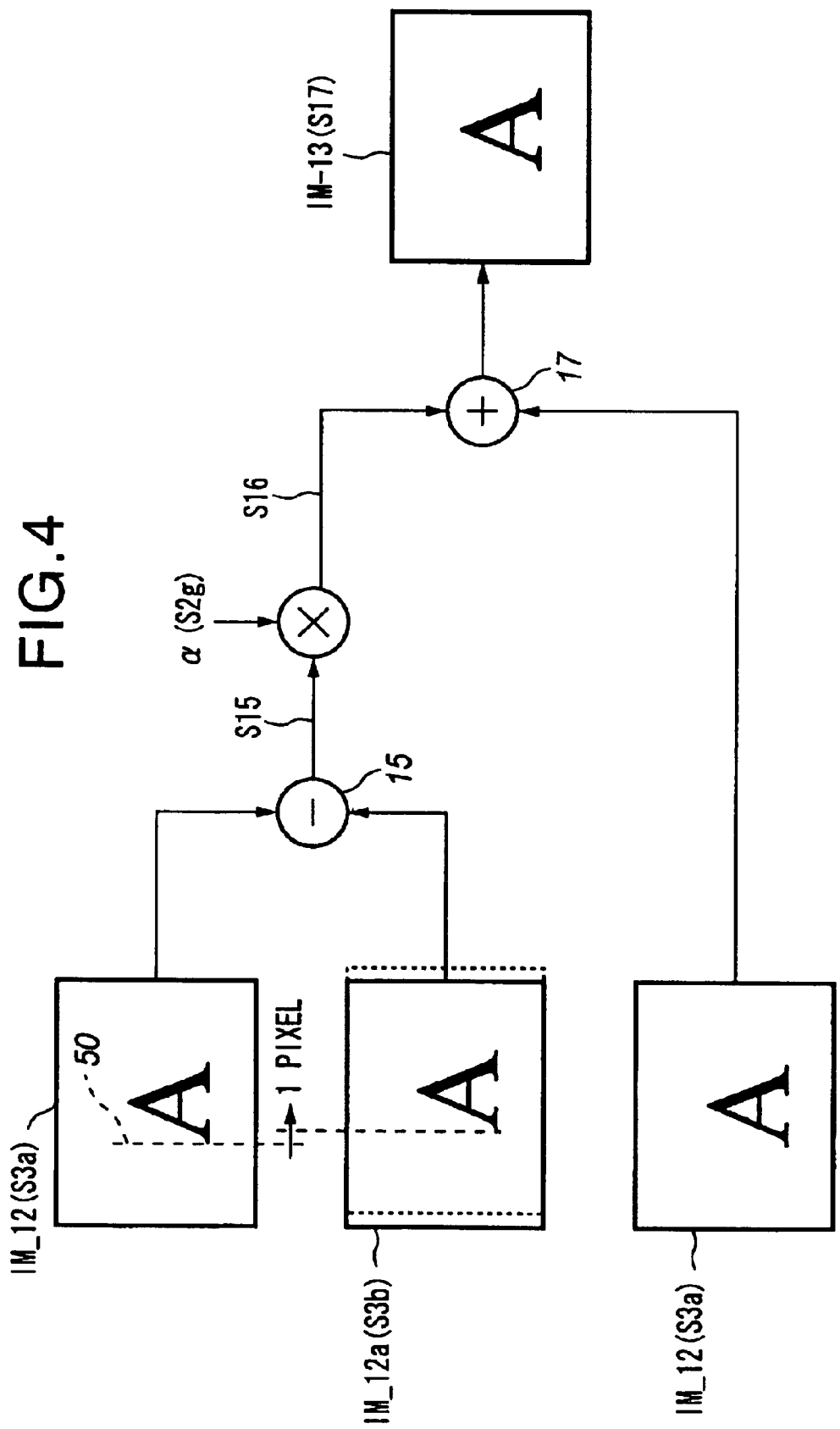
FIG. 4 is a view for explaining a case of edge enhancement using the image processing apparatus shown in FIG. 1.

In this case, the read circuit 10 shown in FIG. 1 reads the image data S3a of the image IM_12 of the letter "A" shown in FIG. 4 from the memory 3, and the selector 12 selects the image data S3a and outputs it to the subtraction circuit 15.

In parallel with this, the read circuit 11 shown in FIG. 1 reads the image data S3b of the image IM_12a obtained by shifting the image IM_12 of the letter "A" shown in FIG. 4 to the right direction by one pixel from the memory 3, and the selector 13 selects the image data S3b and outputs it to the subtraction circuit 15.

In this case, the read operation of the image data S3b of the image IM_12a by the read circuit 11 is performed by using coordinate data (u,v) of the texture image of the letter "A" stored in the memory 3. That is, the read circuit 11 reads the image IM_12a obtained by shifting the image IM_12 by one pixel to the right direction by using a function of texture mapping.

Then, the subtraction circuit 15 subtracts the image data S3b from the image data S3a, that is, subtracts the image IM_12a from the image IM_12, and then outputs the resultant image data S15 to the multiplication circuit 16.

Then, the multiplication circuit 16 multiplies the image data S15 with the coefficient α(=½) designated by the control signal S2g and outputs the resultant image data S16 to the addition circuit 17. The coefficient α is determined in accordance with the degree of the edge enhancement.

Further, in parallel with the processing of the multiplication circuit 16, the read circuit 11 shown in FIG. 1 reads the image data S3a of the image IM_12 from the memory 3, and the selector 14 selects the image data S3b and outputs it to the addition circuit 17.

Then, the addition circuit 17 adds the image data S16 from the multiplication circuit 16 and the image data S3a from the selector 14 to produce the image data S17 and then outputs it to the write circuit 18.

Then, the write circuit 18 writes the image data S17 to the memory 3.

Below, the operation and effects of the edge enhancement of the image processing apparatus 1 explained by using FIG. 4 will be explained.

Figure 5:
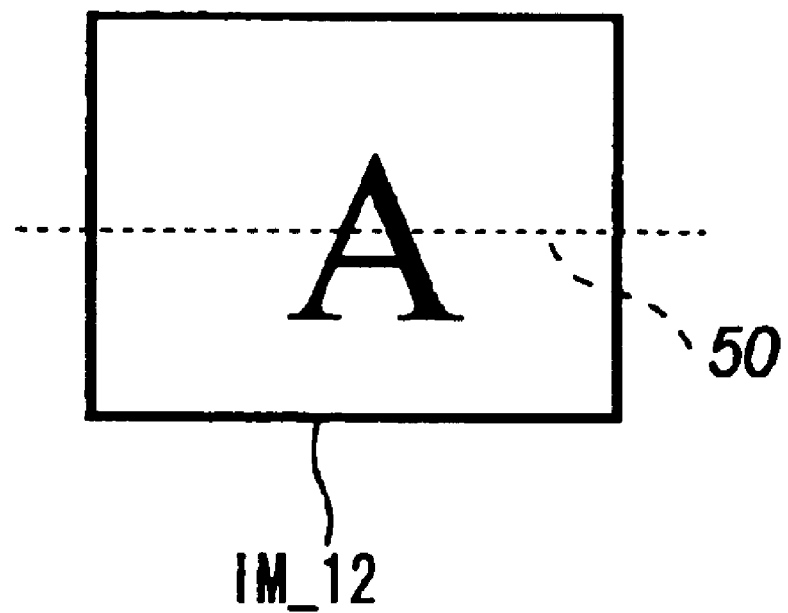
FIG. 5 is a view for explaining the effects of the edge enhancement shown in FIG. 4.
Figure 6:
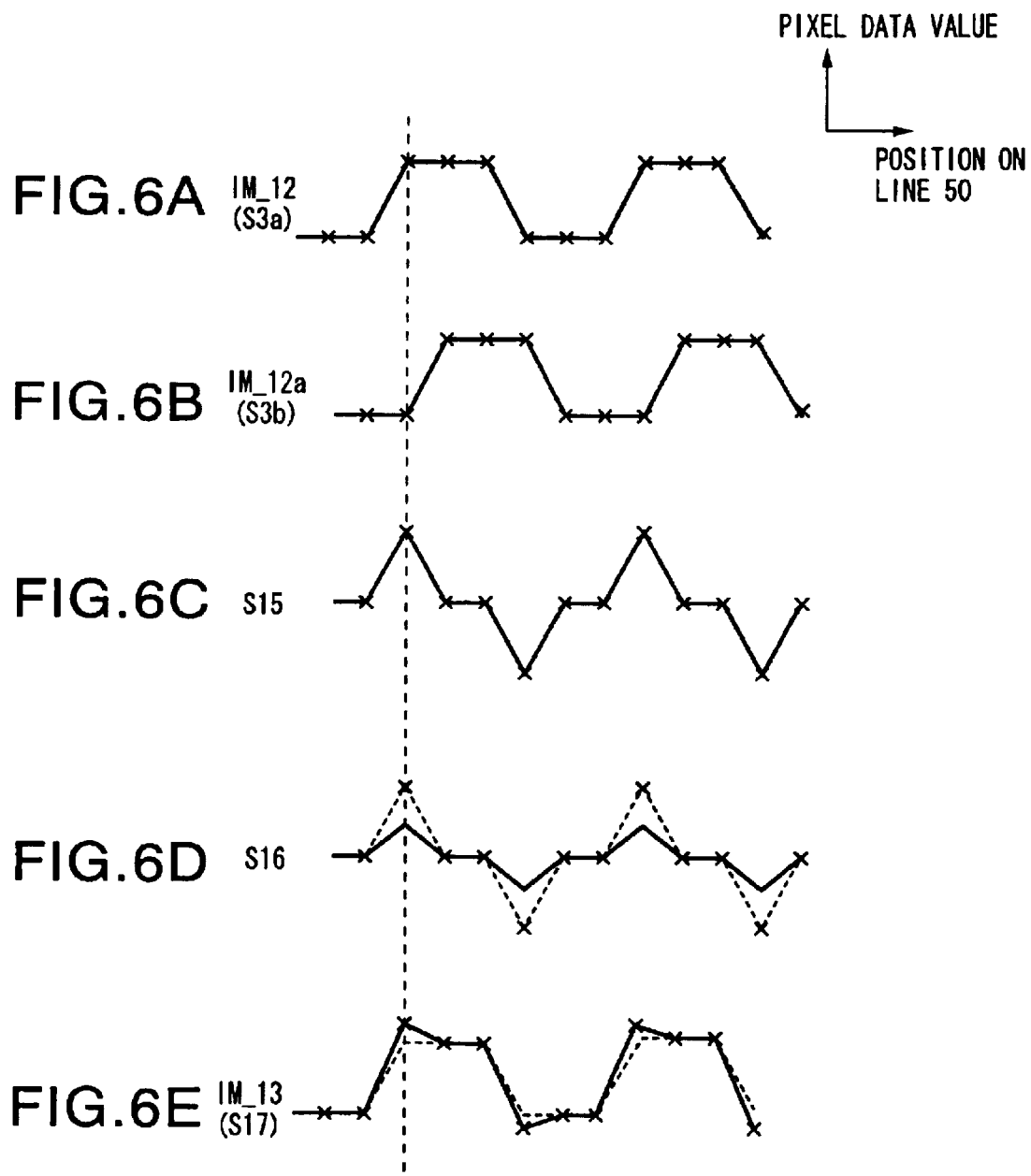
FIG. 6, consisting of FIGS. 6A to 6E, is another view for explaining effects of the edge enhancement shows in FIG. 4.

As shown in FIG. 5, when viewing the pixel values (R, G, and B values) of the pixel data on line 50 of the image IM_12 shown in FIG. 4, the levels of the pixel values become, for example, as shown in FIG. 6A.

Further, the pixel values of the pixel data on line 50 of the image IM_12a obtained by shifting the image IM_12 by one pixel to the right direction become as shown in FIG. 6B.

Further, the pixel values on line 5 of the image data S15 obtained by subtracting the pixel values of the image IM_12a shown in FIG. 6B from the pixel values of the image IM_12 shown in FIG. 6A become as shown in FIG. 6C.

Further, the pixel values on line 50 of the image S16 resulting from multiplying the pixel values of FIG. 6C with α become as shown in FIG. 6D.

Then, the pixel values on line 50 of the image S17 resulting from adding the pixel values of FIG. 6A to the pixel values of FIG. 6D become as shown in FIG. 6E. As shown in FIG. 6E, it is understood that the image IM_13 shown in FIG. 4 becomes an edge enhanced image.

Third Example of Operation

Below, an example of the operation of the image processing apparatus 1 when performing filtering used for blurring an image, suppressing glittering due to the aliasing component at the time of compressing an image, and suppressing the mosaic at the time of enlarging it will be explained.

Figure 7:
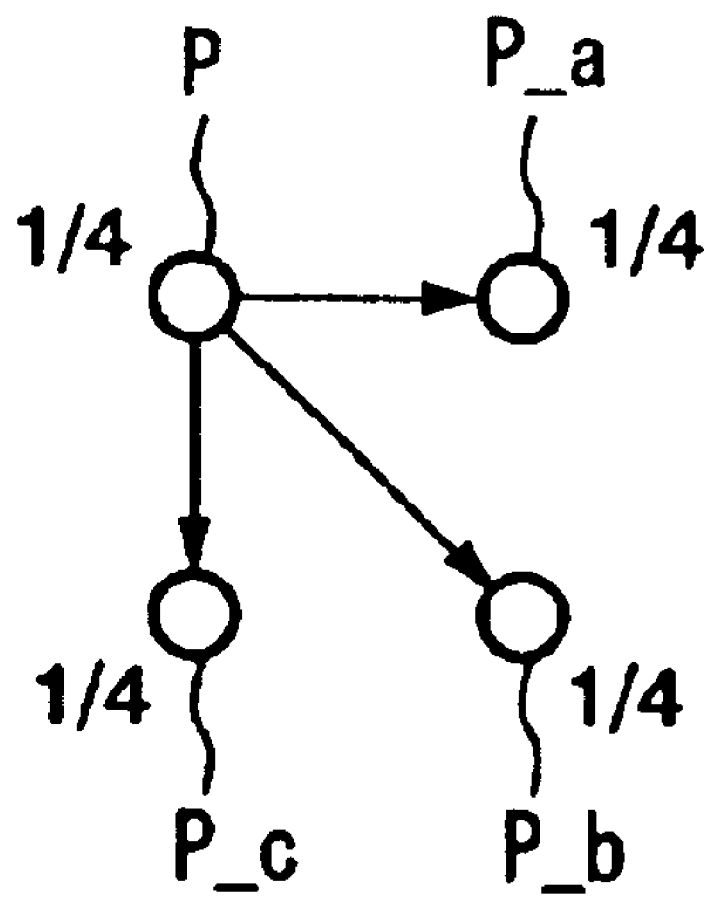
FIG. 7 is a view for explaining the case of blurring by averaging values of four pixels using the image processing apparatus shown in FIG. 1.

For example, as shown in FIG. 7, an example of filtering for averaging pixel values of four adjacent pixels P, P_a, P_b, and P_c to produce a blurred image will be explained.

In this case, when considering filtering with respect to the image IM_12 of the letter "A" explained using FIG. 4, if the image obtained by shifting the image IM_12 by one pixel to the right direction is designated as the image IM_12a, the image obtained by shifting the image IM_12 by one pixel to the right direction and by one pixel to the lower direction is designated as the image IM_12b, and the image obtained by shifting the image IM_12 by one pixel to the lower direction is designated as the image IM_12c, the image processing apparatus 1 filters these images based on the following equation (3):

$$\text{image IM\_12} \times \tfrac{1}{4} + \text{image IM\_12}a \times \tfrac{1}{4} + \text{image IM\_12}b \times \tfrac{1}{4} + \text{image IM\_12}c \times \tfrac{1}{4}$$

$$= \text{image IM\_12}c \times \tfrac{1}{4} + (1\tfrac{1}{4}) \times [\text{image IM\_12}b \times \tfrac{1}{3} + (1\tfrac{1}{3}) \times \{\text{image IM\_12}a \times \tfrac{1}{2} + (1\tfrac{1}{2}) \times \text{image\_12}\}] \tag{3}$$

Figure 8:
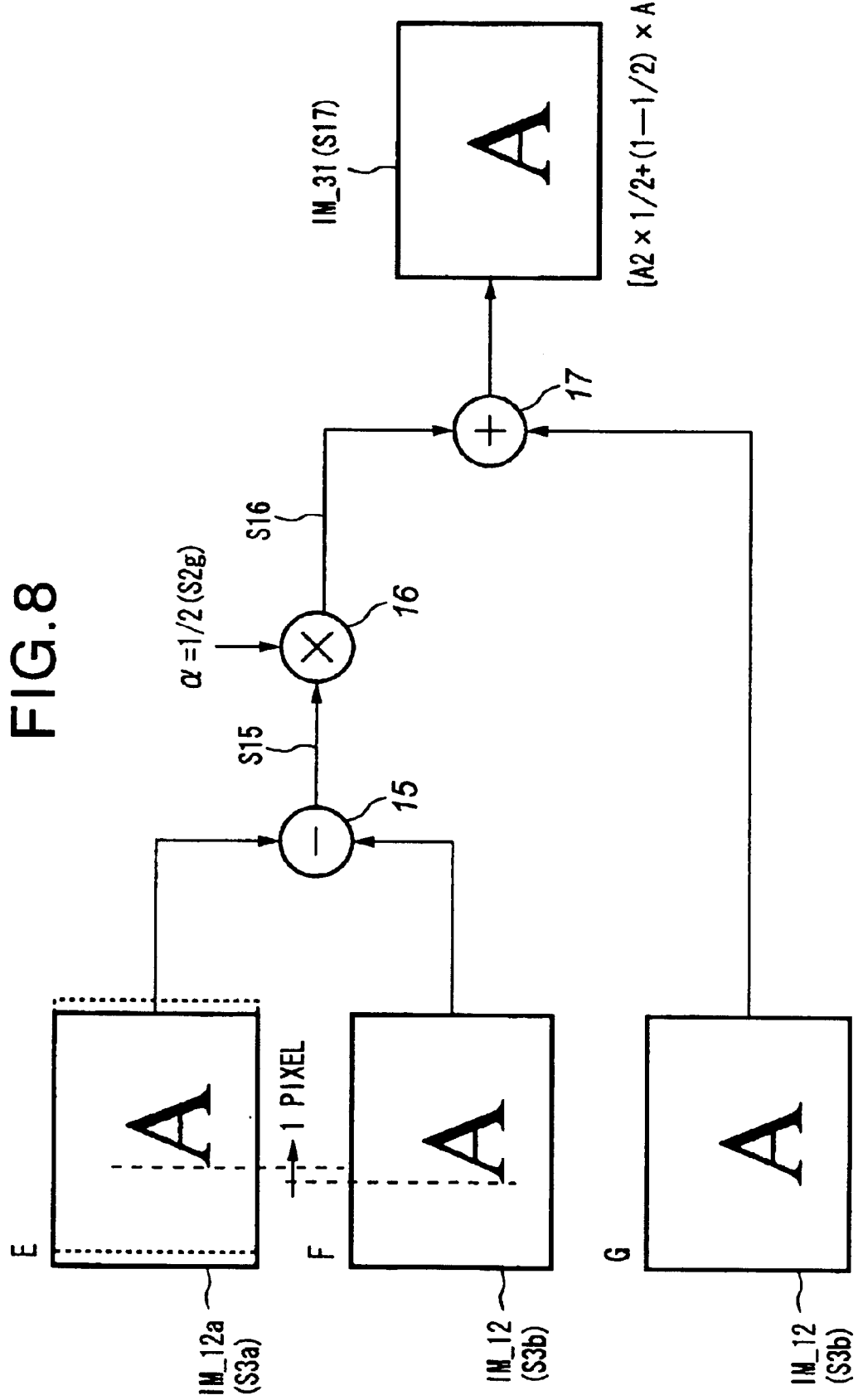
FIG. 8 is a view for explaining an example of an operation when the image processing apparatus shown in FIG. 1 performs processing corresponding to "image $IM\_12a \times \frac{1}{2} + (1\frac{1}{2}) \times$ image $IM\_12$" in equation (3)
Figure 9:
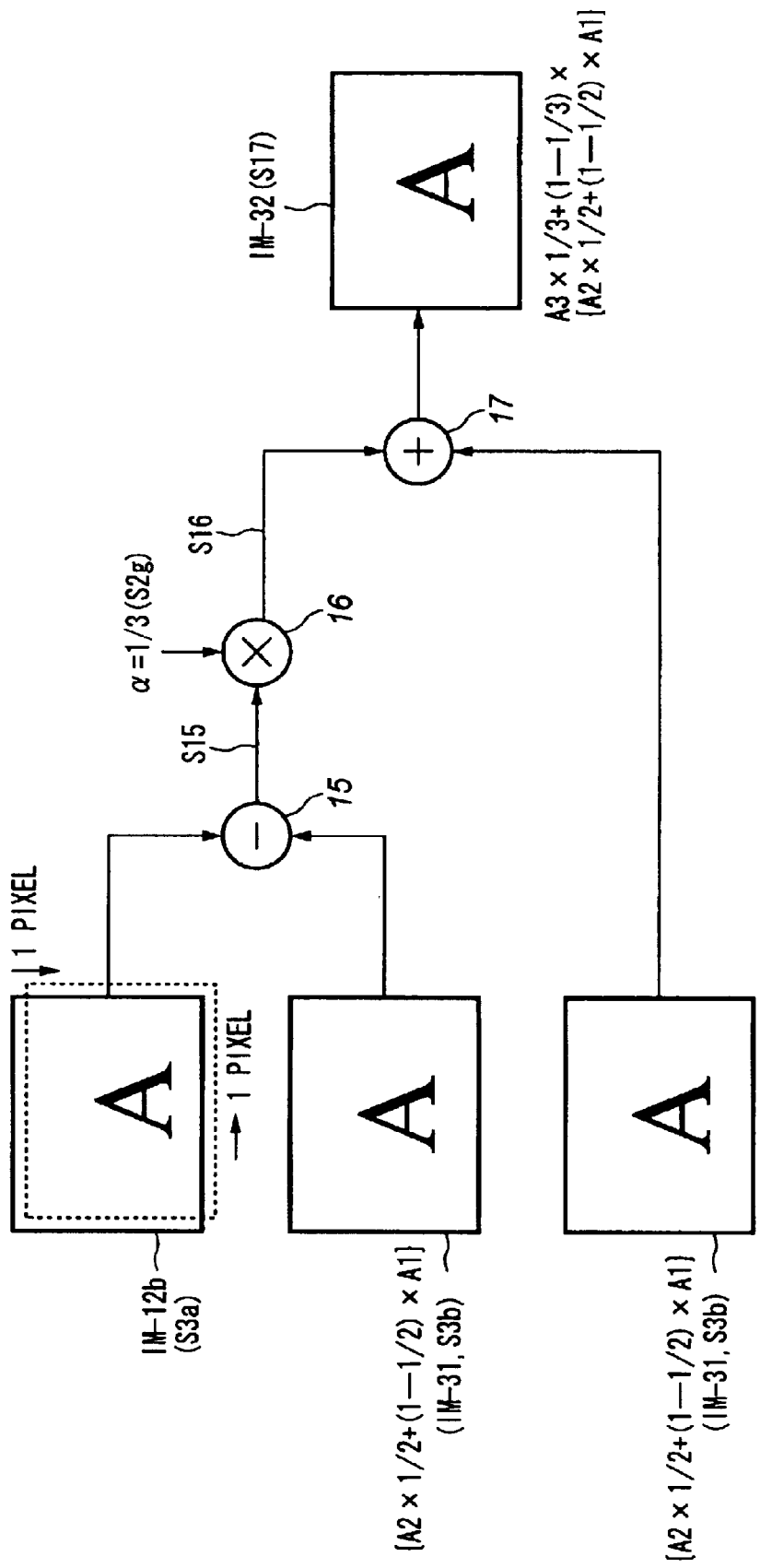
FIG. 9 is a view for explaining an example of an operation when the image processing apparatus shown in FIG. 1 performs processing corresponding to "image $IM\_12b \times \frac{1}{3} + (1\frac{1}{3}) \times \{$image $IM\_12a \times \frac{1}{2} + (1\frac{1}{2}) \times$ image $IM\_12\}$" in equation (3) using a result of the processing "image $IM\_12a \times \frac{1}{2} + (1\frac{1}{2}) \times$ image $IM\_12$" shown in FIG. 8.
Figure 10:
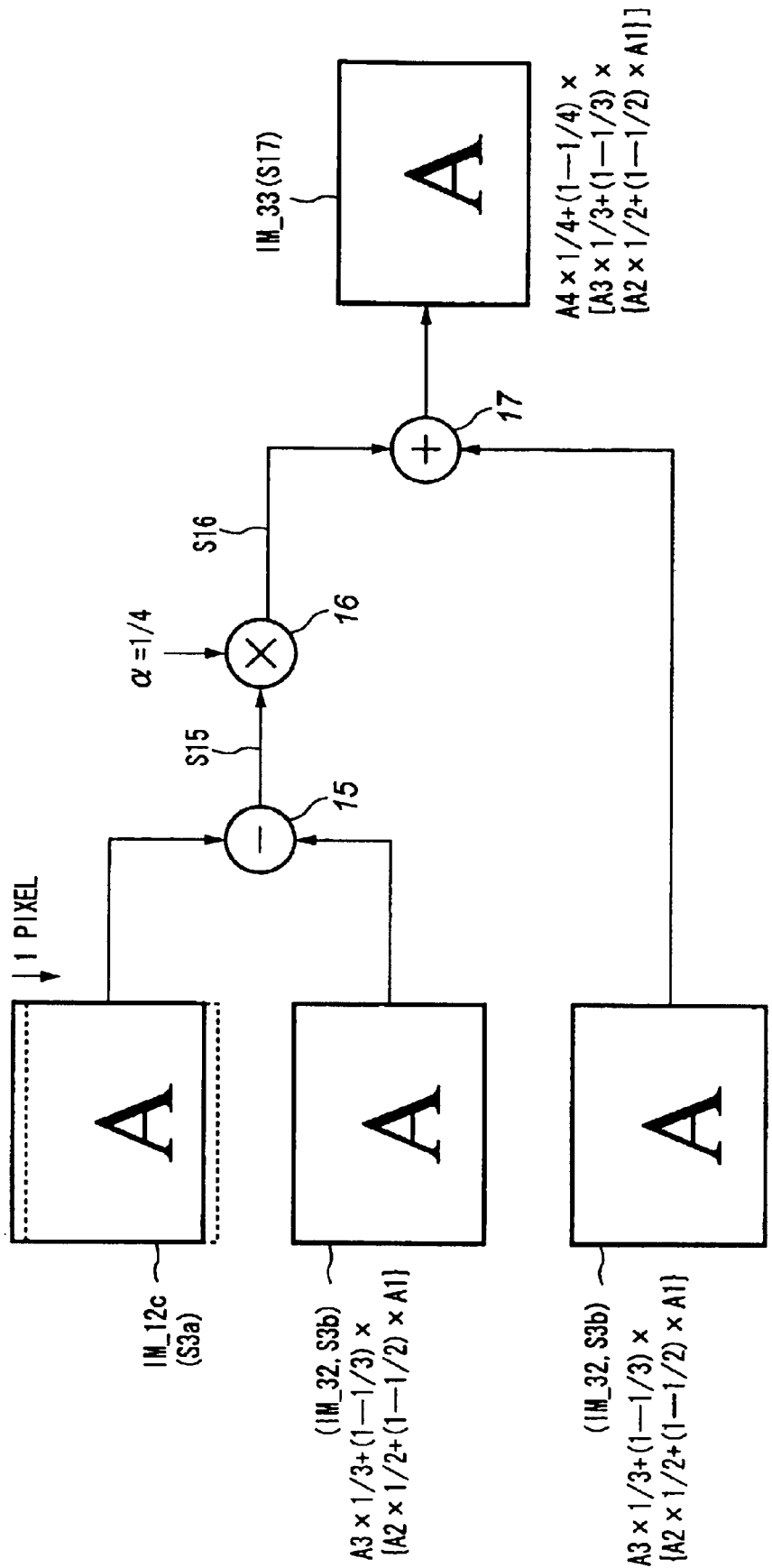
FIG. 10 is a view for explaining an example of an operation when the image processing apparatus shown in FIG. 1 performs processing corresponding to equation (3) using the result of the processing "image $IM\_12b \times \frac{1}{3} + (1\frac{1}{3}) \times \{$image $IM\_12a \times \frac{1}{2} + (1\frac{1}{2}) \times$ image $IM\_12)\}$" shown in FIG. 9.

The image processing apparatus 1 performs processing corresponding to equation (3) as shown in FIG. 8 to FIG. 10.

FIG. 8 is a view for explaining an example of the operation when performing processing corresponding to "image IM_12a×½+(1½)×image IM_12" in equation (3).

FIG. 9 is a view for explaining an example of operation when performing processing corresponding to "image IM_12b×⅓+(1⅓)×{image IM_12a×½+(1½)×image IM_12}" in equation (3) using a result of the processing "image IM_12a×½+(1½)×image IM_12" shown in FIG. 8.

FIG. 10 is a view for explaining an example of the operation when performing processing corresponding to equation (3) using the result of the processing "image IM_12b×⅓+(1⅓)×{image IM_12a×½+(1½)×image IM_12}" shown in FIG. 9.

Below, an example of the operation of the image processing apparatus 1 when performing the processing shown in FIG. 8 and FIG. 9 will be explained.

First, in the image processing apparatus 1, as shown in FIG. 8, the read circuit 10 shown in FIG. 1 reads the image data S3a of the image IM_12a obtained by shifting the image IM_12 of the letter "A" by one pixel to the right direction from the memory 3, while the selector 12 selects the image data S3a and outputs it to the subtraction circuit 15.

At this time, the read operation of the image data S3a of the image IM_12a by the read circuit 10 is performed using the coordinate data (u,v) of the image (for example, texture image) of the letter "A" stored in the memory 3 on the basis of the control signal S2a from the CPU 2. That is, the read circuit 11 reads the image IM_12a obtained by shifting the image IM_12 by one pixel to the right direction from the memory 3 using the texture mapping function.

In parallel with this, the read circuit 11 shown in FIG. 1 reads the image data S3b of the image IM_12 of the letter "A" from the memory 3, and then the selector 13 selects the image data S3b and outputs it to the subtraction circuit 15.

Then, the subtraction circuit 15 subtracts the image data S3b from the image data S3a, that is, subtracts the image IM_12 from the image IM_12a, and then outputs the resultant image data S15 to the multiplication circuit 16.

Then, the multiplication circuit 16 multiplies the image data S15 with the coefficient $\alpha(=\frac{1}{2})$ indicated by the control signal S2g and then outputs the resultant image data S15 to the addition circuit 17.

Further, in parallel with the processing of the multiplication circuit 16, the read circuit 11 shown in FIG. 1 reads the image data S3b of the image IM_12 shown in FIG. 4 from the memory 3, and the selector 14 selects the image data S3b and outputs it to the addition circuit 17.

Then, the addition circuit 17 adds the image data S16 from the multiplication circuit 16 and the image data S3b from the selector 14 to produce the image data S17 of the image IM_31 corresponding to the result of the processing "image IM_12a×½+(1½)×image IM_12" of equation (3) and outputs the image data S17 to the write circuit 18.

Then, the write circuit 18 writes the image data S17 to an address in the memory 3 designated by the control signal S2g.

Next, in the image processing apparatus 1, as shown in FIG. 9, the read circuit 10 shown in FIG. 1 reads the image data S3a of the image IM_12b obtained by shifting the image IM_12 of the letter "A" by one pixel in the right direction and a lower direction from the memory 3, and the selector 12 selects the image data S3a and outputs it to the subtraction circuit 15.

At this time, the read operation of the image data S3a of the image IM_12b by the read circuit 10 is performed by using the coordinate data (u,v) of the image of the letter "A" stored in the memory 3 on the basis of the control signal S2a from the CPU 2. That is, the read circuit 11 reads the image IM_12b obtained by shifting the image IM_12 by one pixel in the right direction and a lower direction from the memory 3 by using the texture mapping function.

In parallel with this, the read circuit 11 shown in FIG. 1 reads the image data S3b of the image IM_31 explained using FIG. 8, and the selector 13 selects the image data S3b and outputs it to the subtraction circuit 15.

Then, the subtraction circuit 15 subtracts the image data S3b from the image data S3a, that is, subtracts the image IM_31 from the image IM_12b, and then outputs the resultant image data S15 to the multiplication circuit 16.

Then, the multiplication circuit 16 multiplies the image data S15 with the coefficient $\alpha(=\frac{1}{3})$ indicated by the control signal S2g and then outputs the resultant image data S16 to the addition circuit 17.

Further, in parallel with the processing of the multiplication circuit 16, in a way similar to the operation described above, the read circuit 11 shown in FIG. 1 reads the image data S3b of the image IM_31 shown in FIG. 8 from the memory 3, and the selector 14 selects the image data S3b and outputs it to the addition circuit 17.

Then, the addition circuit 17 adds the image data S16 from the multiplication circuit 16 and the image data S3b from the selector 14 to produce the image data S17 of the image IM_32 corresponding to the result of the processing "image IM_12a×½+(1½)×image IM_12" of equation (3) and outputs the image data S17 to the write circuit 18.

Then, the write circuit 18 writes the image data S17 to an address of the memory 3 designated by the control signal S2g.

Next, in the image processing apparatus 1, as shown in FIG. 10, the read circuit 10 shown in FIG. 1 reads the image data S3a of the image IM_12c obtained by shifting the image IM_12 of the letter "A" by one pixel in the lower direction from the memory 3, and the selector 12 selects the image data S3a and outputs it to the subtraction circuit 15.

At this time, the read operation of the image data S3a of the image IM_12c by the read circuit 10 is performed by using the coordinate data (u,v) of the image of the letter "A" stored in the memory 3 on the basis of the control signal S2a from the CPU 2. That is, the read circuit 11 reads the image IM_12c obtained by shifting the image IM_12 by one pixel in the lower direction from the memory 3 by using the texture mapping function.

In parallel with this, the read circuit 11 shown in FIG. 1 reads the image data S3b of the image IM_32 from the memory 3, and then the selector 13 selects the image data S3b and outputs it to the subtraction circuit 15.

Then, the subtraction circuit 15 subtracts the image data S3b from the image data S3a, that is, subtracts the image IM_32 from the image IM_12c, and then outputs the resultant image data S15 to the multiplication circuit 16.

Then, the multiplication circuit 16 multiplies the image data S15 with the coefficient $\alpha(=\frac{1}{4})$ indicated by the control signal S2g and then outputs the resultant image data S16 to the addition circuit 17.

Further, in parallel with the processing of the multiplication circuit 16, the read circuit 11 shown in FIG. 1 reads the image data S3b of the image IM_32 shown in FIG. 8 from the memory 3, and the selector 14 selects the image data S3b and outputs it to the addition circuit 17.

Then, the addition circuit 17 adds the image data S16 from the multiplication circuit 16 and the image data S3b from the selector 14 to produce the image data S17 of the image IM_33 corresponding to the result of the processing of equation (3) and outputs the image data S17 to the write circuit 18.

Then, the write circuit 18 writes the image data S17 to an address in the memory 3 designated by the control signal S2g.

As described above, according to the image processing apparatus 1, it is possible to flexibly perform various processing such as α-blending, edge enhancement, and blurring of images, as described above, by having the CPU 2 control the read circuits 10 and 11, the write circuit 18, the selectors 12 to 14, and the multiplication circuit 16 on the basis of control signals S2a to S2g produced in accordance with the execution of the program.

That is, according to the image processing apparatus 1, it is possible to easily change the control signals S2a to S2g produced by the CPU 2 to change the content of the processing just by changing the program without changing the hardware configuration.

The present invention is not limited to the above described embodiment.

Figure 11:
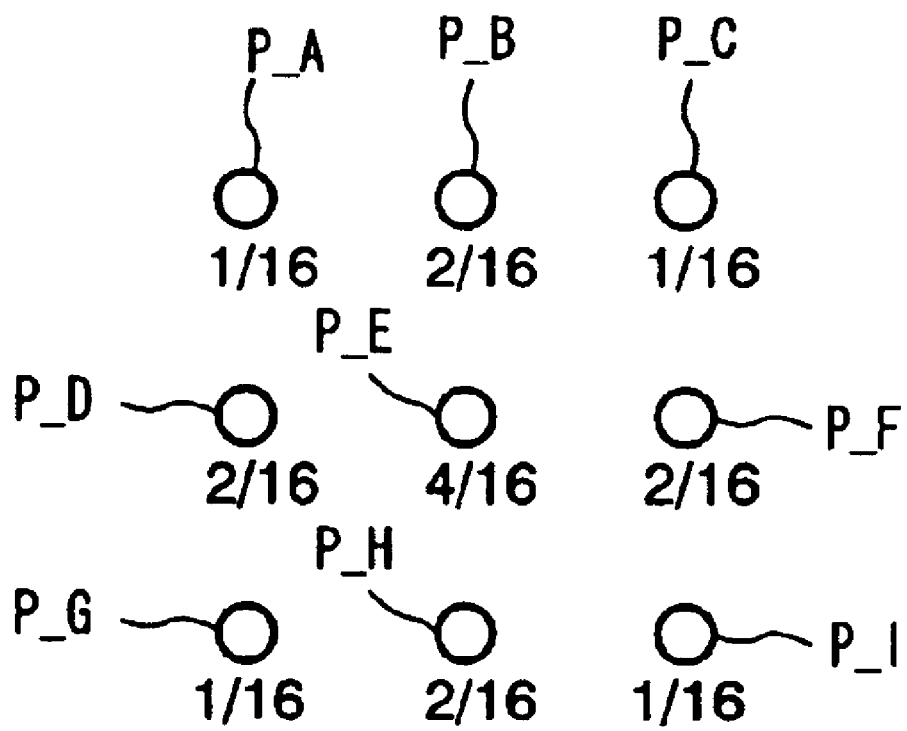
FIG. 11 is a view for explaining a case of blurring by averaging the values of nine pixels using the image processing apparatus shown in FIG. 1.

For example, in the embodiment shown in FIG. 7, an example of filtering for producing blurred images by averaging the values of pixels of four adjacent pixels P, P_a, P_b, and P_c was illustrated, but the image processing apparatus 1 also may produce blurred images by processing based on the following equation (4) when weighting nine adjacent or neighboring pixels P_A, P_B, P_C, P_D, P_E, P_F, P_G, P_H, and P_I, as shown in FIG. 11.

In equation (4), the image IM_A is the original image, the image IM_B is an image obtained by shifting the image IM_A by one pixel to the right direction, the image IM_C is an image obtained by shifting the image IM_A by two pixels to the right direction, the image IM_D is an image obtained by shifting the image IM_A by one pixel to the lower direction, the image IM_E is an image obtained by shifting the image IM_A by one pixel to the right direction and the lower direction, the image IM_F is an image obtained by shifting the image IM_A by two pixels to the right direction and by one pixel to the lower direction, the image IM_G is an image obtained by shifting the image IM_A by two pixels to the lower direction, and the image IM_H is an image obtained by shifting the image IM_A by two pixels to the right direction and lower direction.

$$4/16 \times IM\_A + (1-4/16) \times (2/12 \times IM\_B + (1-2/12) \times (2/10 \times IM\_C + (1-2/10) \times (2/8 \times IM\_D +$$

$$(1-2/8) \times (2/6 \times IM\_E + (1-2/6) \times (1/4 \times IM\_F + (1-1/4) \times (1/3 \times IM\_G + (1-1/3) \times (1/2 \times IM\_H + (1-1/2) \times IM\_I))))))) \quad (4)$$

Further, in the embodiment described above, an example of using the image processing apparatus 1 for α-blending, edge enhancement, and blurring was described, but the image processing apparatus 1 may perform other image processing as well by using the configuration shown in FIG. 1.

Summarizing the effects of the invention, as explained above, according to the present invention, it is possible to provide an image processing apparatus capable of flexibly changing edge enhancement, blurring, and other image effect processing.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2001-203336, filed on Jul. 4, 2001, the disclosure of which is expressly incorporated herein by reference in its entirety.

What is claimed is:

1. An image processing apparatus comprising:
a memory circuit for storing image data;
a read circuit for reading at least first image data, second image data, and third image data from said memory circuit;
a first processing circuit for producing fourth image data indicating a difference between said first image data and said second image data read by said read circuit;
a second processing circuit for multiplying said fourth image data with a predetermined coefficient to produce fifth image data;
a third processing circuit for adding said third image data and said fifth image data to produce sixth image data;
a write circuit for writing said sixth image data to said memory circuit; and
a control circuit for executing a predetermined program to control said read circuit, said first processing circuit, said second processing circuit, said third processing circuit, and said write circuit in accordance with the execution of said program; and
a selecting circuit for outputting said first image data, said second image data, and said third image data to a processing circuit designated by said control circuit among said first processing circuit and said third processing circuit.

2. The image processing apparatus as set forth in claim 1, wherein said read circuit reads said first image data, said second image data, and said third image data on the basis of predetermined coordinate data indicated by said control circuit.

3. The image processing apparatus as set forth in claim 1, wherein
said read circuit reads one image data stored in said memory circuit as said first image data and said third image data and reads another image data as said second image data; and
said second processing circuit multiplies said fourth image data with an α-blending coefficient as said predetermined coefficient to produce said fifth image data.

4. An image processing apparatus comprising:
a memory circuit for storing image data;
a read circuit for reading at least first image data, second image data, and third image data from said memory circuit;
a first processing circuit for producing fourth image data indicating a difference between said first image data and said second image data read by said read circuit;
a second processing circuit for multiplying said fourth image data with a predetermined coefficient to produce fifth image data;
a third processing circuit for adding said third image data and said fifth image data to produce sixth image data;
a write circuit for writing said sixth image data to said memory circuit; and
a control circuit for executing a predetermined program to control said read circuit, said first processing circuit, said second processing circuit, said third processing circuit, and said write circuit in accordance with the execution of said program, wherein
said read circuit reads said first image data, said second image data, and said third image data on the basis of predetermined coordinate data indicated by said control circuit;
said read circuit reads single image data stored in said memory circuit as said first image data and said third image data from a predetermined read position from said memory circuit and reads said second data corresponding to an image obtained by shifting an image corresponding to said single image data by one pixel to a predetermined direction;
said first processing circuit produces a difference between said first image data and said second image data read by said read circuits;
said second processing circuit multiplies said difference with a value corresponding to a degree of edge enhancements; and
said third processing circuit adds a result of the multiplication and said third image data to produce edge enhanced image data.

5. An image processing apparatus comprising:

a memory circuit for storing image data;

a read circuit for reading at least first image data, second image data, and third image data from said memory circuit;

a first processing circuit for producing fourth image data indicating a difference between said first image data and said second image data read by said read circuit;

a second processing circuit for multiplying said fourth image data with a predetermined coefficient to produce fifth image data;

a third processing circuit for adding said third image data and said fifth image data to produce sixth image data;

a write circuit for writing said sixth image data to said memory circuit; and a control circuit for executing a predetermined program to control said read circuit, said first processing circuit, said second processing circuit, said third processing circuit, and said write circuit in accordance with the execution of said program, wherein said read circuit reads said first image data, said second image data, and said third image data on the basis of predetermined coordinate data indicated by said control circuit;

said read circuit reads image data stored in said memory circuit a plurality of times on the basis of said coordinate data while shifting read positions by one pixel; and said control circuit performs control to combine processing of said first processing circuit, said second processing circuit, and said third processing circuit and average the plurality of image data obtained by the plurality of the read operations to produce image data of an image blurring an image corresponding to image data stored in said memory circuit.

6. The image processing apparatus as set forth in claim 5, wherein:

said read circuit reads image data stored in said memory circuit from a predetermined position, reads the image data from a position shifted from said predetermined position by one pixel to the right direction, reads the image data from a position shifted from said predetermined position by one pixel to the lower direction, and reads the image data from a position shifted from said predetermined position by one pixel to the right direction and the lower direction; and said control circuit performs control to average the four series of image data read from the four read positions to produce image data of an image blurring an image corresponding to image data read from said predetermined read position by the operations of said first processing circuit, said second processing circuit, and said third processing circuit.

7. An image processing apparatus comprising:

a memory circuit for storing image data;

a read circuit for reading at least first image data, second image data, and third image data from said memory circuit;

a first processing circuit for producing fourth image data indicating a difference between said first image data and said second image data read by said read circuit;

a second processing circuit for multiplying said fourth image data with a predetermined coefficient to produce fifth image data;

a third processing circuit for adding said third image data and said fifth image data to produce sixth image data;

a write circuit for writing said sixth image data to said memory circuit; and a control circuit for executing a predetermined program to control said read circuit, said first processing circuit, said second processing circuit, said third processing circuit, and said write circuit in accordance with the execution of said program, wherein said control circuit performs control to combine operations of said first processing circuit, said second processing circuit, and said third processing circuit and performs processing while giving predetermined weights to said plurality of image data to produce image data of an image blurring an image corresponding to image data stored in said memory circuit.

* * * * *